June 15, 1943.  M. L. SANDERS  2,321,944
INFORMATION DISTRIBUTION SYSTEM
Filed April 9, 1942  3 Sheets-Sheet 1
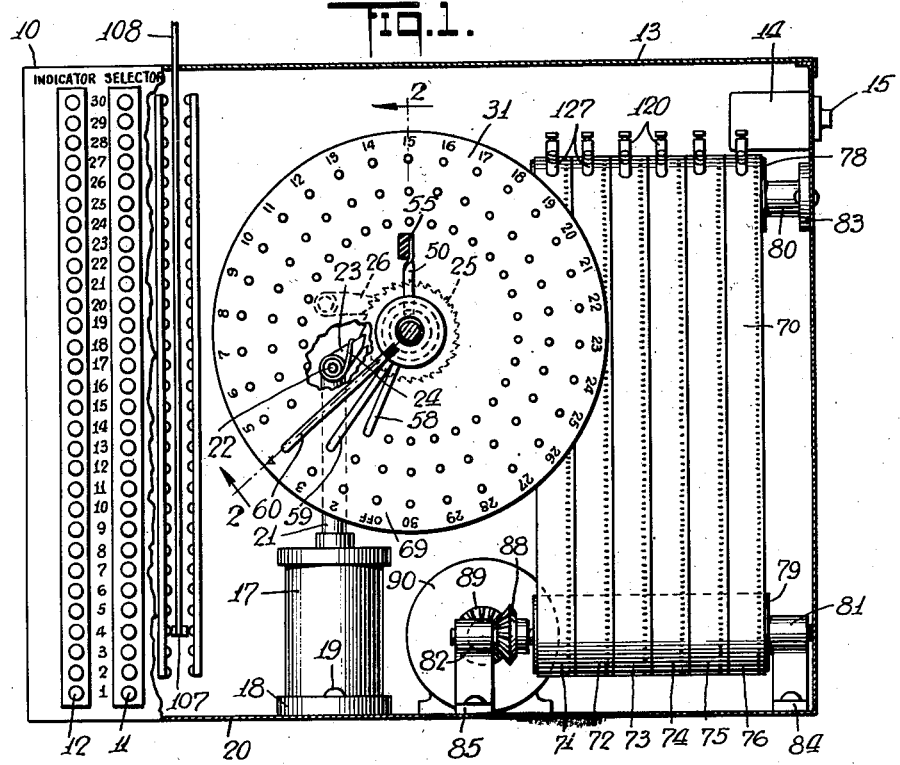
INVENTOR
Mack L. Sanders
BY
ATTORNEY

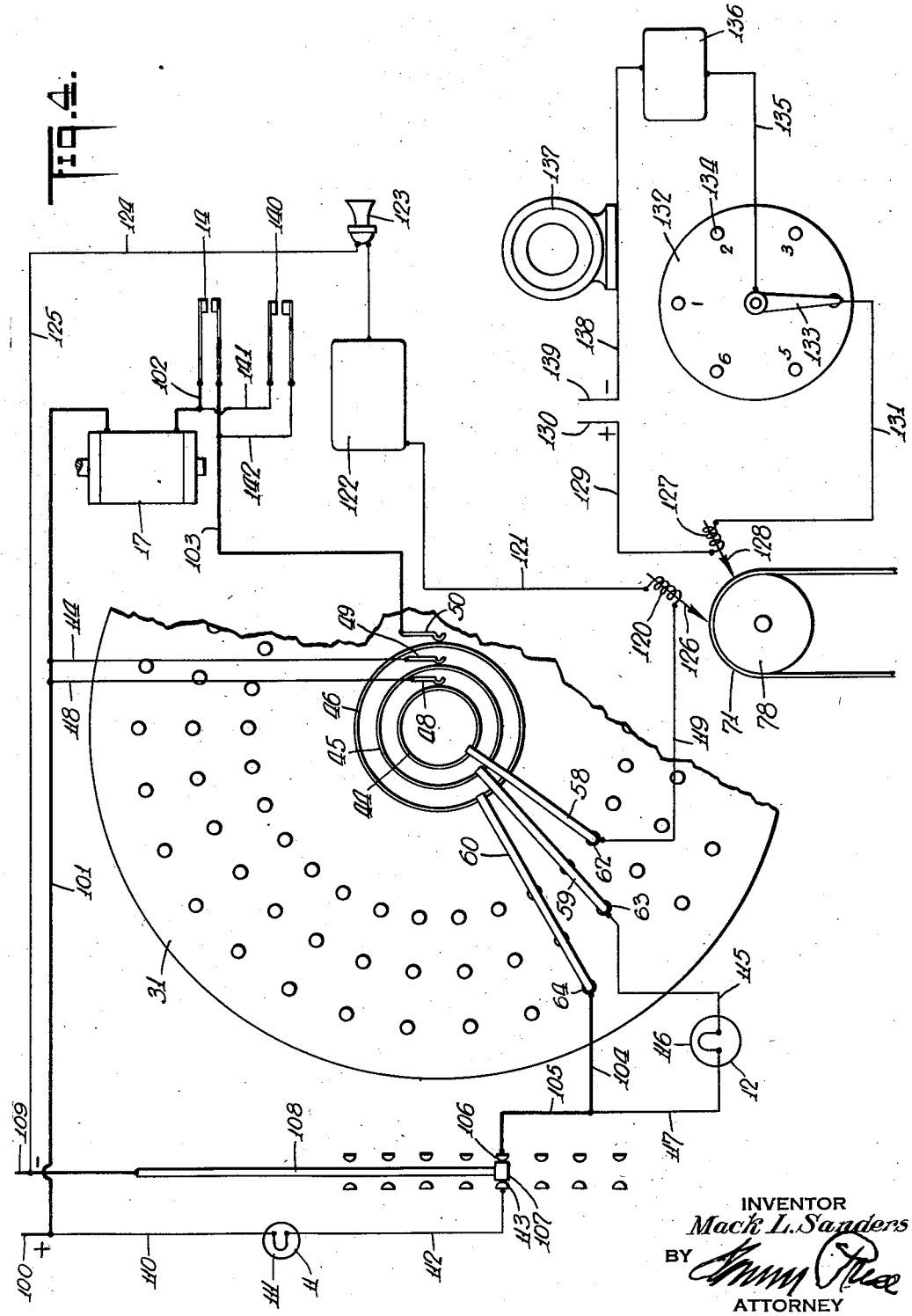

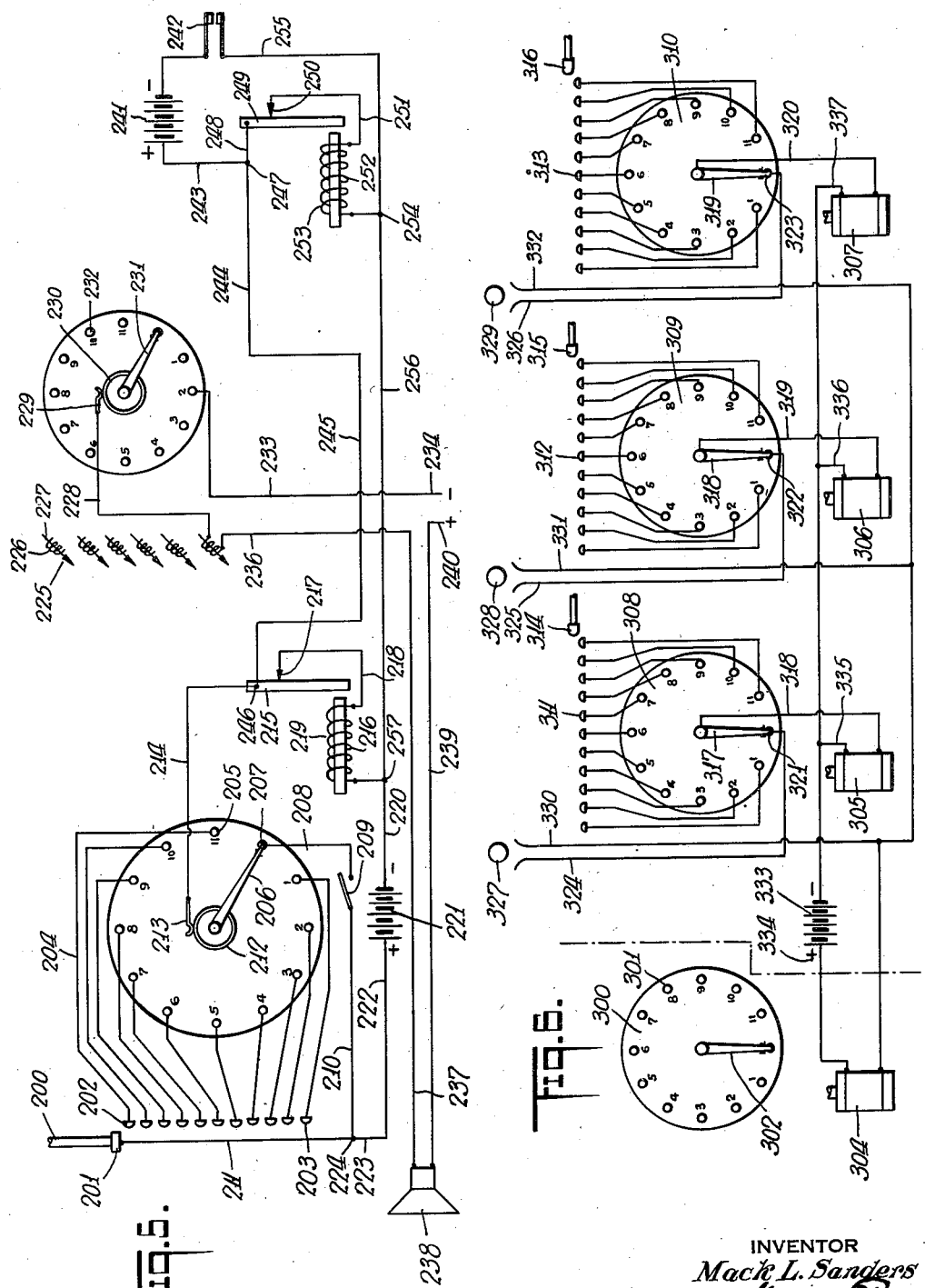

Patented June 15, 1943

2,321,944

UNITED STATES PATENT OFFICE 2,321,944

INFORMATION DISTRIBUTION SYSTEM

Mack L. Sanders, Brooklyn, N. Y.

Application April 9, 1942, Serial No. 438,349

4 Claims. (Cl. 179—6)

The present invention relates to an information distribution system and it particularly relates to a wired semi-automatic or fully automatic information distribution system.

In distributing information over wires, it is often desirable to permit clients or users of telephones or other wired communication facilities to receive information relating to current events, sporting events, stock market quotations and so forth, without the necessity of dialling separately or putting in a separate call for each one of these items for information.

For example, it is desirable that a subscriber or owner of telephone or other wired facilities be able to communicate with a central source by wire over his telephone or other wired facilities and obtain several pieces of desirable information in rapid sequence without substantial delay in a semi-automatic or fully automatic manner upon the payment of one fee or putting in one call.

It is, therefore, among the objects of the present invention to provide a simple, reliable information distribution system which will enable a subscriber for a small fee, usually associated with one call, to obtain several pieces of available information in rapid sequence and succession upon putting through such call, which system will be able to make use of readily available communication facilities.

Another object is to provide an improved information distribution system which will enable rapidly changing information about the news, sporting results, stock market quotations and so forth, to be supplied to subscribers upon the payment of a single fee or by putting one call over available wire facilities.

Still further objects and advantages will appear from the more detailed description set forth below, it being understood, that this more detailed description is given by way of illustration, since various changes therein may be made by those skilled in the art without departing from the scope and spirit of the present invention.

Although not restricted thereto, the present invention contemplates supplying information over private or leased telephone wires so that a subscriber may, by putting in a single call from a private telephone or pay station, obtain information about several subjects.

For example, by dialling different numbers different types of information may be obtained; or this may be done by first dialling a number and then dialling two or three other numbers after connection is made to the information center, depending upon the number and characters of items of information desired.

Preferably, the system may function semi-automatically by having the subscriber tell the attendant at the central office what pieces of information are desired, and such attendant may then set the central transmitting apparatus to transmit such information, desirably from a central sending source utilizing metallic tapes which are continuously operated.

There may be, for example, 10 pieces of information, each one on a separate tape or on different tracks positioned side by side on a single tape, and as soon as the tape reaches its zero point the information will then be transmitted in the desired sequence.

Ordinarily, a subscriber for a single fee will be limited to three pieces of information and desirably these will be transmitted to him in the sequence in which they are positioned on the tape machine, rather than the sequence in which they are dialled or requested.

If any intervals are necessary, there may be provided a source of a buzzing or clicking sound to come on the circuit or incidental music may be employed, until the sequence of information items is ready for transmission.

Referring to the drawings which show one embodiment of the construction according to the present invention, but to which the present invention is by no means restricted, since many changes and variations may be made, all within the scope thereof, Fig. 1 is a front elevational view of a panel board at the central information station, partly broken away to show the construction of the control mechanism behind the board;

Fig. 2 is a transverse sectional view upon the line 2—2 of Fig. 1, upon an enlarged scale as compared to Fig. 1;

Fig. 3 is a top perspective view of a portion of the metallic tape control mechanism;

Fig. 4 is a diagrammatic layout of the circuit system utilized in connection with the control mechanism of Fig. 1;

Figs. 5 and 6 are alternative circuit arrangements which may be used in lieu of the arrangement shown in Fig. 4.

Referring to Fig. 1, the panel board 10 is provided with two vertical rows of lights 11 and 12 positioned in side-by-side relationship, one to enable ready selection of items to be transmitted and the other to indicate the selection being transmitted.

As indicated, the selector bank of lights 11 and the indicator bank of lights 12 are provided with 30 lights arranged at one side of the panel board 10, but if desired a larger number of lights could be utilized and different methods of arrangement could be employed.

In back of the instrument board 10 is a casing 13 which is provided with a starting switch 14 having the push button 15. Within this casing is a step relay 17 which is mounted by the base 18 and the screws or bolts 19 upon the floor 20 of the casing 13. This relay, which is actuated until the circuit is closed, is connected to the upwardly extending arm 21 which is pivotally mounted at 22 to the actuating pawl 23 having the spring 24. The actuating pawl 23 actuates a ratchet 25 and is provided with a detent pawl 26 which prevents reverse motion.

As shown best in Fig. 2, the ratchet 25 has a stud 27, which is fixed by the set screw 28 to the shaft 29. The shaft 29 extends through the opening 30 in the stationary contact plate 31, and it extends rearwardly to the back 32 of the housing 13, where it is provided with a bearing member 33 having the hub 34.

On the shaft 29 is positioned the sleeves 36, 37 and 38 carrying the outwardly extending flange portions 40, 41 and 42 which carry the contact rings 44, 45 and 46. These contact rings contact with the stationary brushes 48, 49 and 50 which are mounted at 52, 53 and 54 upon the insulating bar 55 attached by the bracket 56 to the rear wall 32. Fixedly mounted on the rear of the discs 40, 41 and 42 are the finger contacts 58, 59, 60, the ends of which contact with the circular rows of contact buttons 62, 63 and 64. These contact buttons are mounted upon the contact plate 31 and are provided with the connections 66, 67 and 68, the arrangement of which is more fully shown in Fig. 4.

As shown upon Fig. 4, there are thirty buttons 62, 63 and 64 in four concentric rows, plus an additional set at the off position 69.

The row of buttons 64 forms part of the step relay selector circuit.

The row of buttons 63 controls the circuit of the position indicator.

The row of buttons 62 controls the voice current circuit.

At the right of the casing is provided the tape machine 70 which has a plurality of metallic recording tapes 71, 72, 73, 74, 75, 76 which, as shown, are separate tapes but which, if desired, could be one wide tape with a plurality of recording tracks positioned side-by-side. These tapes run continuously on drums 78 and 79 which have trunnions provided with bearings 80, 81 and 82 mounted at 83, 84 and 85 upon the walls of the casing 13. The tapes are perforated as indicated at 86 in Fig. 3, and these perforations engage teeth 87 on the drums 78 and 79.

The shaft of the drum 79 carries the bevel gear 88 which meshes with the bevel gear 89 and is driven by the motor 90. The motor 90 continuously drives and keeps the tapes 71, 72, 73, 74, 75 and 76 moving each with its information relating to sports, current events, racing results, foot-ball scores, stock market quotations, etc., each of which tapes may carry a message of 5, 10, 15 or even 30 seconds duration, as the case may be.

In the circuit arrangement as shown in Fig. 4, from the positive side of the circuit 100 one circuit extends at 101 to the step relay 17 which has a connection at 102 to the manual starting switch 14. From the chart side of the manual starting switch 14 extends the electrical connection 103 to the contact arm 50 which contacts the contact ring 46. From the contact ring 46 this circuit extends through the contact finger 60 to the electrical connections 104 and 105 to one of the row of contact buttons 106, through the contact element 107 of the contact bar 108 to the negative side of the circuit at 109.

The second circuit extends from 100 through the electrical connection 110, through one of the lights 111 of the bank 11. Then the circuit extends at 112 to one of the contact buttons on the row 113 and then back through the contact element 107 and the bar 108 to the negative side of the line at 109. The other circuit extends from the positive side of the line 100 through the electrical connection 101, the electrical connection 114, the contact finger 49, the contact ring 45, the finger contact 59, the connector 115, one of the lights 116 of the bank 12, and electrical connections 117, 105, 106, 107 and 108 back to the negative side of the line at 109.

The fourth circuit extends from the positive side of the line 100 through the conductor 101, the conductors 118, the contact finger 48, the ring 44, the finger contact 58, the electrical connection 119 to the pick-up coil 120, electrical connection 121, the amplifier 122, the telephone or loud speaker 123 and the electrical connections 124 and 125 back to the negative side of the line at 109.

As shown at the lower right hand corner of Fig. 4, the pick-up coil 120 is provided with an armature member 126 which is in electrical cooperative relationship with one of the tapes, say, the tape 71 which carries the sound track and rotates continuously on the drum 78. There is also provided a recording coil 127 (see Figs. 1 and 4) provided with an armature 128. The recording coil 127 is in the circuit including the electrical connections 129 from the positive side of the line at 130, 131, to the sound track selector 132. The sound track selector 132 has an arm 133 which may be moved to any of the positions 134 when it is desired to change the information or recording upon any one of the six tapes or six sound tracks. By manually turning the arm 133 to the corresponding tape member, the message or information on such tape may be wiped off and a new message put upon the tape. The circuit also includes the electrical connection 135, the amplifier 136 and microphone 137 with the connection 138 to the negative side of the line 139.

When a new message is to be put upon the tape, the tape is selected from the dial 132 and then the information is placed upon the tape through the microphone 137 and the amplifier 136.

Connected between the lines 102 and 103 is also the micro-switch 140 with the electrical connections 141, 142. This micro-switch moves the relay one step at a time.

Briefly, the system shown in Figs. 1 to 4 employs pre-recorded messages, preferably carried by the steel tapes 71 to 76, all inclusive, which may be played back into a telephone line, public address system or any other circuit through the device 123.

The selection of the particular tape which it is desired to hear is made by means of the sliding selector switch 107—108. Each position of the selector switch 107—108 is connected to a position of the arms 58, 59 and 60, into which position the arms will be placed by the step-by-step relay 17.

The operation of the switch 107—108 lights a pilot light 111 in the bank 11, indicating the particular member chosen, and it also opens the circuit of the step relay 17.

The step relay 17 then operates until the arms 58, 59 and 60 have been moved to the contact button 62, 63 or 64, which corresponds to the particular contact button 106 which has been contacted by the element 107 of the switch 107—108. This will result in the message or recording from one tape being transmitted through the amplifier 122 and the telephone 123 to a telephone line, public address system or any other circuit.

At the end of the transmission, the micro-switch 140 once more operates the step relay and then the relay will again be actuated until it closes a circuit through the next button 106 which has been selected. If only two selections are to be played, the relay 17 goes to rest or off position, where it remains until the starting switch 14 is again actuated. When the relay 17 is in rest position or off position, the micro-switch is disconnected so that no impulses of that circuit can start the relay in operation again.

It is only after the relay 17 has been taken off rest or off position by the starting switch that the micro-switch 140 will function again.

The lamps 116 in the bank 12 show the tape which is being utilized for transmission of a message at any moment.

The fourth circuit mentioned above through the amplifier 122 conducts the voice current from any one of the tape machine pick-up coils 120 into the small pre-amplifier 122, which amplifies the signal or voice sufficiently so that it may be transmitted at 123 directly into a telephone line.

If more than one step relay 17 is employed, the last position of each preceding relay should switch or turn on the indicated direct current relay into the following relay so that the next relay will be rotating whenever the micro-switch 140 has gone through one complete cycle.

Then, when the last relay has completed its cycle, it switches the first relay 17 back to the rest or off position, at which it remains until a new selection of messages to be played is made.

In recording upon any one of the tapes through the microphone 137, a clock may be provided in front of this recording position so that the announcer or recorder can load the tape with as many messages as time will permit, that is, the time for a complete cycle of each of the tapes. It is noted that all of the tapes will begin and finish at the same time, or will be in synchronism with one another.

It is also possible, however, to have tapes of different lengths at different positions, one of the tapes, for example, recording for 45 seconds, another for 30 and another for 15, with suitable changes in the rest of the system.

In the circuit arrangement shown in Fig. 5, there is shown a selector switch 200 with the contact head 201 which contacts one of the buttons 202 of the row of buttons 203. The button 202 is connected by the circuit connection 204 to the contact point 205, each of the buttons 202 of the row 203 being connected to a different contact point. The arm 206 rotates continuously, the position 207 being an off position which is connected through the circuit connection 208, the starting switch 209 and the circuit connections 210 and 211, to the contact head 201. The central disc 212 cooperates with the contact finger 213, which is connected by line 214 to the solenoid 215 of the step relay 216. The contact 217 extends through the connection 218, the coil 219 and the connection 220 back to the negative side of the battery 221. The positive side of the battery 222 connects at 223 to the junction point 224 and from the junction point 224 it connects with the lines 211 and 210.

At the position 225 are indicated a group of tape recording machines by the pick-up coils 226 with the armatures 227, these coils being each connected through a conduit connection 228 and a spring finger 229 to a ring 230 connected to an arm 231. The arm 231 rotates over the various buttons 232 which are connected to the negative side of the line through the connections 233, 234. The other side of the tape machines 227 is connected by the connections 236, 237 to the loud speaker 238 and the connection 239 back to the positive side of the line at 240. The battery 241 is connected at its negative side to the micro-switch 242 and its positive side 243 to the circuits 242 and 245 to the junction point 246 on the armature 215. There is also the connection from the junction point 247 and the circuit 248 to the armature 249 having the contact point 250 and the connection 251 to the coil 252 of the relay 253. The coil 252 connects at the junction point 254 with the connections 255 and 256 from the other side of the micro-switch 244 which lead to the junction point 257 and the connection 220 to the negative side of the battery 221.

According to the circuit arrangement shown in Fig. 5, any desired number of items of information may be sent out from the tape machines 226 by the automatic step relay 216.

Two separate sources of power are required, one at 234—240 for the loud speaker 238, and another storage battery source at 221 and 241 for operation of the relays 216 and 253. The remote relay 216, which may be positioned where the information is to be heard, is associated with a stalling switch 209, which may be manually or coin operated.

The number of selections to be made is controlled by the switch 200—201, and the relay 201 will be set in actuation only when the starting switch 209 is closed. The voice selector relay 252, 253 is shunted directly across the remote stepping relay 216 so that the latter relay 216 will follow every impulse of the relay 252.

The voice selector relay 252 is connected to the micro-switch 242 associated with the tap machines 225 in such a way as to permit the micro-switch to advance both relays one point after each selection has been played.

In respect to the system shown in Fig. 6, there is shown a control indicator relay dial 300, having the contact points 301 and the rotatable arm 302 to contact any one of said points 301. There are shown four step relays 304, 305, 306, 307 and the three dials 308, 309 and 310 each being provided with a plurality of contact points 311, 312 and 313 and a sliding contact at 314, 315, 316. These contactors 314, 315 and 316 are designed to pick out the appropriate contact 311, 312 and 313. The rotatable arms 317, 318 and 319 of each dial are provided with electrical connections 318, 319 and 320 to one side of the relay coils 305, 306 and 307.

The arms 317, 318 and 319 are shown in off position where they contact one of the buttons 321, 322 and 323, which leads to contact wires 324, 325 and 326 to cooperate with a coin control indicator 327, 328 and 329. The coin control 327, 328 and 329 is also designed to work with the other side of the circuit 330, 331 and 332. The battery 333 is connected at its positive side to the solenoid 304 and at its negative side by the connections 335, 336 and 337 to the solenoids 305, 306 and 307. In the system shown in Fig. 6, the loud speaker (not shown) and the selecting mechanism 311, 312, 313, 314, 315 and 316 is remotely controlled. As shown, there are three series (although there may be more or less) of buttons or contact points 311, 312 and 313 cooperating with the adjustable switches 314, 315 and 316.

At a central booth there is located the main central indicator control relay, which may be provided with necessary indicator lines as shown in Fig. 1, for indicating the position of the numbers which have been chosen.

In operation, a selection is made on the first row of push buttons 311, and the starting switch is then pushed through the coin inserted, as indicated, to close the circuit 324—330.

The relay 305 will then operate the arm 317 to correspond to the button 311, which has been set in the circuit. The main relay 304 at the central station will also follow to the same point.

The operator then can read off the number or numbers, mark them down and then by pushing the micro-switch can make the remote relays 305, 306 and 307 climb to the next selected position.

At the central station adjacent the dial 300 a light (not shown, but similar to that shown in Fig. 1) will indicate the position at which the remote relay, say at 306, has stopped and, after the operator has recorded that number, the micro-switch (not shown, but of the same construction and operation as shown at 140 in Fig. 1) can be operated to make both relays advance the third selected number.

If no more than three selections are permitted, a limiting device (not shown) may be incorporated in the selector circuits, as shown to the right of the dot and dash line in Fig. 6. Thereupon the first relay 304 will go back into off or zero position. Until that time the light will appear on all other push button circuits so that a new selection may be made and more coins inserted. It will be noted that in the arrangement of Fig. 6, the same functioning takes place no matter what selections are made, since all selector circuits are connected in parallel.

The present application contains matter taken from application Ser. No. 301,326, filed October 26, 1939.

Although wired systems are preferred the remote selector station may be connected to the central information distribution source by radio or without wired communication.

The detailed construction and operation of the micro-switch and the tape machines has not been described since it forms no part of the present invention and since these constructions are fully shown in prior patents such as:

If desired single messages or selected messages as to a single stock market quotation may also be obtained at frequent or repeated intervals.

The present invention may also be particularly useful in transmitting air raid instructions or information to plurality of control stations or as a general broadcast even without selection by a subscriber or customer at a remote selector station.

These instructions or the information, which may be continuously broadcast may be changed at will as the alarm or emergency progresses or is over.

These changes may be made by the system shown at 126 to 129 of Fig. 4.

If desired, instead of requiring a subscription or payment for each item or succession of items of information, a pamphlet or magazine or newspaper may be distributed for a small fee and this would give numbers to be dialed to obtain a desired number or succession of items of information so that anyone having the pamphlet will be able to dial for the desired information.

It will be understood that many changes could be made in the particular features of information distribution system as shown, and many apparently widely different embodiments of this invention could be made without departing from the scope thereof; it is intended that all matter contained in the above description shall be interpreted as illustrative and not in a limiting sense.

What is claimed is:

1. An information distribution system comprising a remote selector and a central information source, connections therebetween for transmitting a selection from the selector to the source and then a plurality of sound tracks, means for operating said sound tracks continuously and means for causing said sound tracks to transmit information successively to the selector.

2. An information distribution system comprising a remote selector and a central information source, connections therebetween for transmitting a selection from the selector to the source and then a plurality of sound tracks, means for operating said sound tracks continuously and means for causing said sound tracks to transmit information successively to the selector, said sound tracks consisting of magnetic tapes, continuously rotating drums carrying said tapes and magnetic means to pick up messages from and deposit new messages on said tapes.

3. An information distribution system comprising a remote selector and a central information source, connections therebetween for transmitting a selection from the selector to the source and then a plurality of sound tracks, means for operating said sound tracks continuously and means for causing said sound tracks to transmit information successively to the selector, said source also including a selector system, an indicator system, a dial with concentric rows of contacts, a plurality of spaced contact arms, a step by step relay for advancing said arms and circuit connections between said selector system, indicator system, said rows of contacts and said contact arms.

4. An information distribution system comprising a remote selector and a central information source, connections therebetween for transmitting a selection from the selector to the source and then a plurality of sound tracks, means for operating said sound tracks continuously and means for causing said sound tracks to transmit information successively to the selector, a selector means at the central station to select a sound track and a relay contact to connect said sound track to be transmitted to said remote selector.

MACK L. SANDERS.